(12) United States Patent
Weber

(10) Patent No.: US 10,094,230 B2
(45) Date of Patent: Oct. 9, 2018

(54) BRUSH SEAL SYSTEM FOR SEALING A CLEARANCE BETWEEN COMPONENTS OF A TURBO ENGINE THAT ARE MOVABLE IN RELATION TO ONE ANOTHER

(71) Applicant: MTU Aero Engines AG, Munich (DE)

(72) Inventor: Julian Weber, Munich (DE)

(73) Assignee: MTU Aero Engines AG, Munich (DE)

( * ) Notice: Subject to any disclaimer, the term of this patent is extended or adjusted under 35 U.S.C. 154(b) by 268 days.

(21) Appl. No.: 14/749,356

(22) Filed: Jun. 24, 2015

(65) Prior Publication Data

US 2015/0377049 A1 Dec. 31, 2015
US 2017/0370236 A9 Dec. 28, 2017

Related U.S. Application Data

(63) Continuation-in-part of application No. 14/508,212, filed on Oct. 7, 2014, now Pat. No. 9,777,588.

(30) Foreign Application Priority Data

Jun. 25, 2014 (DE) ........................ 10 2014 212 174

(51) Int. Cl.
*F01D 11/00* (2006.01)
*F16J 15/3288* (2016.01)

(52) U.S. Cl.
CPC ............ *F01D 11/00* (2013.01); *F01D 11/001* (2013.01); *F16J 15/3288* (2013.01);
(Continued)

(58) Field of Classification Search
CPC ........ F16J 15/3288; F16J 15/44; F01D 11/00; F01D 11/001; F01D 25/28
(Continued)

(56) References Cited

U.S. PATENT DOCUMENTS 5,215,435 A * 6/1993 Webb ........................ F01D 5/08
277/414
7,445,212 B2 * 11/2008 Gail ..................... F16J 15/3288
277/355
(Continued)

FOREIGN PATENT DOCUMENTS

DE 10 2013 213 386 B3 8/2014
DE 10 2013 217 581 A1 3/2015
(Continued)

OTHER PUBLICATIONS

German Office Action dated May 12, 2015 (Five (5) pages).
(Continued)

*Primary Examiner* — Logan Kraft
*Assistant Examiner* — Sabbir Hasan
(74) *Attorney, Agent, or Firm* — Crowell & Moring LLP

(57) ABSTRACT

A brush seal system for sealing a clearance between components of a turbo engine that are movable in relation to one another, in particular of a thermal gas turbine, is disclosed. The brush seal system includes a brush seal housing, which accommodates at least one brush head of a brush seal, where the brush seal housing includes a first component having a cover plate section and a second component having a support plate section. The first component includes an axial flange forming a fish mouth seal on an end opposite the cover plate section. A thermal gas turbine having such a brush seal system is also disclosed.

12 Claims, 2 Drawing Sheets

(52) U.S. Cl.
CPC ...... *F05D 2220/32* (2013.01); *F05D 2240/56* (2013.01); *Y02T 50/672* (2013.01)

(58) Field of Classification Search
USPC .......................................................... 277/355
See application file for complete search history.

(56) References Cited

U.S. PATENT DOCUMENTS

| | | | |
|---|---|---|---|
| 7,516,962 B2 * | 4/2009 | Boeck | F01D 11/001 |
| | | | 277/355 |
| 2002/0020968 A1 | 2/2002 | Gail et al. | |
| 2012/0003084 A1 | 1/2012 | Matwey et al. | |
| 2015/0098798 A1 * | 4/2015 | Klan | F01D 11/003 |
| | | | 415/111 |

FOREIGN PATENT DOCUMENTS

| | | |
|---|---|---|
| EP | 1 347 218 A2 | 9/2003 |
| EP | 2 351 952 A1 | 8/2011 |
| EP | 2 722 486 A1 | 4/2014 |
| EP | 2 857 721 A1 | 4/2015 |
| WO | WO 2004/101957 A1 | 11/2004 |

OTHER PUBLICATIONS

European Search Report issued in European counterpart application No. 15169528.5-1751 dated Nov. 18, 2015, with Statement of Relevancy (Nine (9) pages).

* cited by examiner

BRUSH SEAL SYSTEM FOR SEALING A CLEARANCE BETWEEN COMPONENTS OF A TURBO ENGINE THAT ARE MOVABLE IN RELATION TO ONE ANOTHER

This application claims the priority of German Patent Application No. DE 10 2014 212 174.4, filed Jun. 25, 2014, the disclosure of which is expressly incorporated by reference herein.

BACKGROUND AND SUMMARY OF THE INVENTION

The present invention relates to a brush seal system for sealing a clearance between components of a turbo engine that are movable in relation to one another, in particular a thermal gas turbine, including a brush seal housing, which accommodates at least one brush head of a brush seal, where the brush seal housing includes a first sheet metal part having a cover plate section and a second sheet metal part having a support plate section. The invention also relates to a thermal gas turbine having a brush seal system.

Various brush seal systems for turbo engines, in particular thermal gas turbines, are known from the prior art. There are numerous application cases in which two parts that are movable in relation to one another are to be sealed non-hermetically with respect to one another. Such an application case includes, for example, sealing an annular clearance through which gas flows between a stator and a rotor in a gas turbine, for example, for an airplane. Brush seal systems are often used for non-hermetic sealing of annular interspaces between assemblies rotating in relation to one another, because brush seal systems are lighter and more compact than labyrinth seals while providing the same sealing effect. For example, U.S. 2002/0020968 A1 discloses various brush seal systems for aircraft engines. The brush seal systems each includes a multipart brush seal housing, which accommodates the actual brush seal and secures it in position. Each brush seal housing therefore consists of at least one support plate and one cover plate, which are joined together and extend together around at least one brush head of the brush seal system in a U shape, securing it to prevent it from falling out of the brush seal housing. The cover plate and/or the upstream region in the direction of flow of the two-part brush seal housing should primarily hold back problematical flow effects on a brush bundle protruding away from the brush head and out of the brush seal housing, while the support plate of the brush seal housing which is situated downstream as seen in the direction of flow serves as a support element which should prevent the brush bundle from sagging in the axial direction of the turbine engine, in particular the aircraft engine, based on the pressure difference over the brush seal housing. One-piece brush seal housings, which are also designed to have at least an approximately U-shaped cross section, are also known.

However, one disadvantage of the known brush seal systems can be regarded as the fact that they usually have brush seal housings that are designed to be separate and require a comparatively large installation space which is not available in all turbo engines and in particular not in all engine applications.

The object of the present invention is therefore to provide a brush seal system of the type defined in the introduction, which is designed so that it requires a comparatively small installation space for installation in a turbo engine. Another object of the invention is to provide a thermal gas turbine which such a brush seal system.

A first aspect of the invention relates to a brush seal system for sealing a clearance between components of a turbo engine that are movable in relation to one another, in particular a thermal gas turbine. In particular a clearance between a rotor and a stator of a thermal gas turbine such as an aircraft engine is to be sealed. The brush seal system according to the invention therefore includes a brush seal housing which accommodates at least one brush head of a brush seal where the brush seal housing includes a first sheet metal part having a cover plate section and a second sheet metal part having a support plate section. The first sheet metal part has an axial flange for forming a fish mouth seal on an end opposite the cover plate section. Due to the integration of the brush seal housing and the fish mouth seal into one component, it has a double function, which leads to a significant reduction in the required installation space in comparison with a brush seal housing and fish mouth seals that are designed separately. The axial flange functions as a deflector of the fish mouth seal, for example. A radially inner platform of a guide vane arrangement with one or more guide vanes on which the brush seal system is mounted is situated on the outside radially of the axial flange and opposite it. An axial flange of an upstream and neighboring rotor blade arrangement having one or more rotor blades may be arranged radially between the inner platform of the guide vane arrangement and the axial flange. A lightweight design is also possible and can be implemented inexpensively due to the sheet metal design. The brush seal system according to the invention is suitable in particular for integration of a brush seal into an intermediate step seal of a turbo engine, in particular a thermal gas turbine, from the standpoint of lightweight design.

In another advantageous embodiment of the brush seal system according to the invention, the second sheet metal part includes a mounting section for direct or indirect mounting of the brush seal system on a guide vane, a guide vane cluster or a guide vane ring of the turbo engine on an end opposite the support plate section. In addition to the design of a brush seal and a partial element of the fish mouth seal, due to this design of the brush seal system according to the invention, this can also assume a fastening function via the mounting section of the second sheet metal part. This integrated design of the brush seal system according to the invention can advantageously replace the use of separately designed brush seal housings, fish mouth seals and mounting devices for the brush seal system on a guide vane, a guide vane cluster or a guide vane ring. In particular this leads to advantages due to the small number of components that require only a few joining operations. Therefore, novel, faster and more efficient manufacturing methods are also possible and can be ready for mass production relatively quickly. It is also possible to replace individual components separately, which greatly increases the reparability of the system as a whole. In addition, the tightness and robustness of the brush seal system according to the invention are ensured. Due to the use of conventional materials, namely sheet metal, this yields an excellent geometric scalability of the brush seal system according to the invention to be manufactured.

Since the brush seal housing is designed in multiple parts, in particular in two parts, the structural design freedom of the brush seal system according to the invention can be further increased.

In another advantageous embodiment of the brush seal system according to the invention, it includes at least one reinforcing element, which is secured on the second sheet metal part in the region of the supporting sheet metal section. The mechanical properties of the brush seal system can therefore be improved significantly.

In additional advantageous embodiments of the brush seal system according to the invention, the supporting sheet metal section of the second sheet metal part has a support element for contact with a brush bundle of the brush seal. This reliably prevents sagging of the brush bundle in the axial direction of the turbo engine, in particular the aircraft. It is possible here for the support element to be designed in one piece with the supporting sheet metal section or as a separate element. An advantageous increase in the design freedom of the brush seal system is achieved in that the support element is designed as a separate component from the second sheet metal part because there is a corresponding separation of the functions "brush seal carrier," which is also satisfied by the brush seal housing and/or the second sheet metal part, and "support of the brush bundle," which is now taken over by separate support elements in this embodiment of the invention. Due to the separation of the function regions of the brush seal system, in addition to an increased geometric design freedom, there is also simplified manufacturing as well as an increased simplification and ease of repairs, because in a damage incident, i.e., after scraping against a rotor, for example, only the separate support element must be overhauled or replaced, but the brush seal housing carrying the brush seal need not. Accordingly, much greater freedom is allowed in the design of the brush seal housing with regard to its mechanical and structural behavior. Another advantage is that the brush seal system according to the invention can be adapted particularly easily to different intended applications and types of engines because the same brush seal housing need only be combined with different brush seals and support elements in order to adapt the brush seal system to radial clearances of different sizes, for example. The advantages mentioned last are also derived for the case of a one-time and/or integral design of the support element with the second sheet metal part. Furthermore, there is the possibility here that an end region of the separately designed support element might be arranged closer to an end of the brush bundle opposite the brush head than an end region of the second sheet metal part. This ensures that in the case of any scraping contact, only the support element which is closer to the ends of the brush bundle is damaged, but not the second sheet metal part which is at a greater distance from the ends of the brush bundle. This permits designs of the brush seal system that are much more tolerant of scraping because, in the event of damage, it is not necessary to dismantle the brush seal housing and/or the brush seal. In a further embodiment of the invention, an additional increase in the design freedom is given by the fact that the support element, which is designed separately, is designed in a ring shape and/or in the shape of ring segments. In particular a ring segment-shaped design of the support element facilitates any repairs in particular because as a rule it is only necessary to repair or replace a damaged ring segment but not the entire ring. Basically, the brush seal housing and/or the entire brush seal system can be designed to be segmented. In another advantageous embodiment of the invention, it is provided that the separately designed support element is made of a different material than the second sheet metal part and/or has a different wall thickness than the second sheet metal parts. Based on the free choice of materials and/or the different wall thicknesses, the brush seal system can be designed with a particularly great variability and optimally adapted to different intended applications.

Additional advantages are achieved when the separately designed support element is arranged between the supporting sheet metal section and the reinforcing element. In this way, the support element can be secured in position by a type of clamping. In addition, the support element and the reinforcing element may advantageously be secured on the supporting sheet metal section of the second sheet metal part or on other regions of the second sheet metal part with the help of a common fastening means. This permits a particularly rapid, easy and inexpensive assembly and disassembly of the support element.

In another advantageous embodiment of the invention it is provided that the reinforcing element is designed as a curved sheet metal plate and/or the reinforcing element is riveted to the second sheet metal part of the brush seal housing and/or at least one sliding element, in particular a sliding block, is arranged between the reinforcing element and the second sheet metal part of the brush seal housing. Since the reinforcing element is designed as a curved sheet metal plate, a resilient flexible reinforcement of the brush seal housing can be achieved expensively and with a simple design. If the reinforcing element is riveted to the second sheet metal part of the brush seal housing, a form-fitting and/or force locking connection between the reinforcing element and the brush seal housing on the whole is achieved inexpensively and with a simple design. Due to the arrangement of a sliding block between the reinforcing element and the second sheet metal part of the brush seal housing, a bearing site with one degree of translatory freedom for spoke centering of the brush seal system is ensured with a simple design. The bearing site is formed by the sliding element, in particular a sliding block such that the sliding block in the installed state of the brush seal system engages in a corresponding groove of a guide vane, for example, or a guide vane cluster. Due to the spoke centering, changes in dimension between the components arranged coaxially and to be sealed with respect to one another, i.e., between a stator and a rotor, that are due to thermal influences can be compensated better. The sliding element(s), in particular the sliding blocks, may be designed as separate modules and may be connected to the reinforcing element by riveting, for example.

In other advantageous embodiments of the brush seal system according to the invention, the first and second sheet metal parts may be designed in one piece or as separate components. A design as separate components may lead to a simplified replacement or repair of the individual parts, or of the brush seal system on the whole. The first and second sheet metal parts may be joined together in a form-fitting and/or physically bonded manner. A one-piece design of the first and second sheet metal parts reduces the number of parts to be installed so that a time advantage is achieved in the manufacture and installation of the brush seal system.

In another advantageous embodiment of the brush seal system according to the invention, the reinforcing element on one end opposite the contact element, includes an axial flange to form an additional fish mouth seal situated downstream from the first fish mouth seal formed with the first sheet metal part, based on the position. Again in this case, the axial flange functions as a deflector for the fish mouth seal, for example. The radially inner platform of the guide vane arrangement with one or more guide vanes on which the brush seal system is mounted via the mounting section of the second sheet metal part on the outside of and opposite the axial flange radially. An axial flange of a rotor blade arrangement having one or more rotor blades may be arranged radially between the inner platform of the guide vane arrangement and the axial flange downstream and nearby. Due to the integration of a second axial flange to form an additional fish mouth seal situated downstream, this advantageously yields a compact and integral design of the brush seal system with integrated fish mouth seals which in turn requires a smaller installation space in comparison with known designs.

A second aspect of the invention relates to a thermal gas turbine, in particular an aircraft engine having at least one brush seal system which is designed according to the first aspect of the invention. The resulting features and advantages thereof can be derived from the descriptions of the first aspect of the invention wherein advantageous embodiments of the first aspect of the invention are to be regarded as advantageous embodiments of the second aspect of the invention and vice versa.

In an advantageous embodiment of the thermal gas turbine according to the invention, it is provided that the brush seal housing of the brush seal system for sealing the clearance between a rotor and a stator of the gas turbine is secured on the stator. In other words, it is provided that the brush seal housing is directly or indirectly secured on a stator of the gas turbine, so that the ends of the brush bundle opposite the brush head are in contact with the respective surface of the rotor. This creates an arrangement of the brush seal system that has a particularly stable mechanical design and is more reliable in operation.

In another embodiment, it has been found to be advantageous if the stator is designed as a guide vane and/or as a guide vane cluster and/or as a guide vane ring. If the stator has a segmented design, it has been found to be advantageous if the brush seal system has a segmented design because a particularly simple assembly and disassembly are made possible in this way.

Additional features of the invention are derived from the claims, the exemplary embodiments and on the basis of the drawings. The features and combinations of features mentioned above in the description as well as the features and combinations of features mentioned in the exemplary embodiments which follow may be used not only in the particular combination given but also in other combinations without going beyond the scope of the present invention.

DETAILED DESCRIPTION OF THE DRAWINGS

Figure 1:
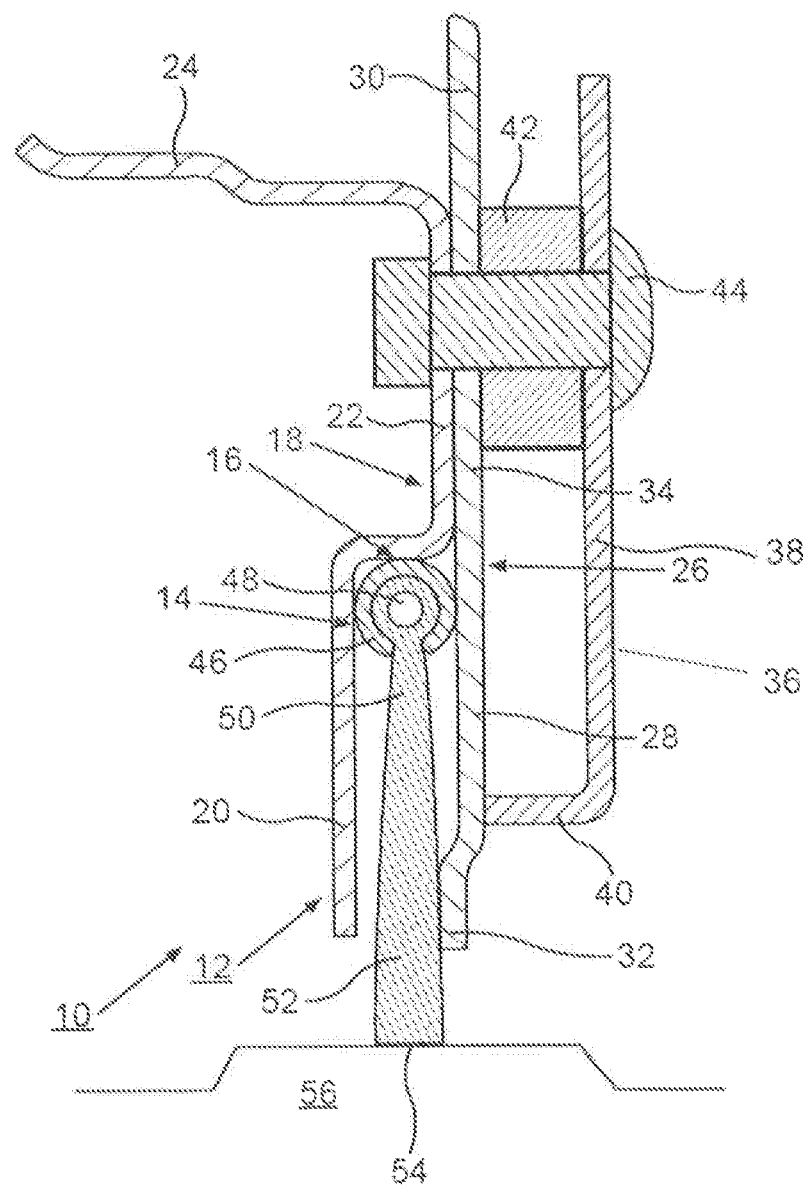
FIG. 1 shows a schematic sectional diagram of a brush seal system in a first embodiment according to the invention.

FIG. 1 shows a schematic sectional diagram of a brush seal system 10 according to a first embodiment. The brush seal system 10 serves to seal a clearance between components of a turbo engine that are movable in relation to one another, in particular a thermal gas turbine. The components that are movable in relation to one another include in particular a rotor and a stator of a turbo engine, in particular an aircraft engine in this exemplary embodiment. The brush seal system 10 includes a brush seal housing 12 to accommodate a brush head 14 of a brush seal 16. The brush seal housing 12 extends around the brush seal 16 essentially in a U shape. It can be seen here that the brush seal housing 12 is designed in two parts, including a first sheet metal part 18 with a cover plate section 20 and a second sheet metal part 26 with a support plate section 28. The receptacle for the brush head 14 of the brush seal 16 is designed by the cover plate section 20 and the support plate section 28. The second sheet metal part 26 is arranged downstream from the first sheet metal part 18 in the direction of flow. However, the first and second sheet metal parts 18, 26 may also be designed in one piece. In the exemplary embodiment shown here the first and the second sheet metal parts 18, 26 are connected to one another in a form-fitting manner.

In addition, it can be seen that the first sheet metal part 18 includes an axial flange 24 to form a fish mouth seal on the end opposite the cover plate section 20. The term "axial flange" is to be interpreted here to mean that the respective flange extends essentially in parallel to an axis of a rotor 56 of the turbo engine. The axial flange 24 according to the exemplary embodiment serves as a deflector for the fish mouth seal. On the outside radially and opposite the axial flange 24, there is a platform on the inside radially of a guide vane arrangement having one or more guide vanes (not shown) to which the brush seal system 10 is attached. An axial flange of a rotor blade arrangement upstream and nearby and having one or more rotor blades (not shown) may be arranged radially between the inner platform of the guide vane arrangement and the axial flange 24.

In addition, it can be seen that the second sheet metal part 26 has a fastening section 30 on one end opposite the support plate section 28 for direct or indirect fastening of the brush seal system 10 to the guide vane arrangement of the turbo engine (not shown). Furthermore, the brush seal system 10 has a reinforcing element 36 which is in contact with the second sheet metal part 26 in the region of the support plate section 28 via a contact element 40. In the exemplary embodiment shown here, the reinforcing element 36 also has a foundation element 38, which extends essentially parallel to a central section 34 of the second sheet metal part 26 in the radial direction. The reinforcing element 36 is designed as a metal plate curved approximately in a J shape and connected to the second sheet metal part 26 by a rivet 44. In addition, a sliding element 42 designed as a sliding block is arranged between the reinforcing element 36 and the second sheet metal part 26 and is also secured by the rivet 44 on the brush seal system 10. Furthermore, a radial flange 22, which is designed as an integral component of the first sheet metal part 18, is connected to the first sheet metal part 18 and the reinforcing element 36 by the rivet 44 between the cover plate section 20 and the axial flange 24. The sliding element 42 forms a bearing site with one degree of translatory freedom for spoke centering of the brush seal system 10. During assembly, the sliding element 42 here engages in a corresponding groove on the guide vane, a guide vane cluster or a guide vane ring (not shown). Due to the spoke centering of the brush seal system 10, relative changes in dimension due to thermal effects between the stator and rotor 56 can be equalized better. However, the brush seal system 10 according to the invention is essentially not limited to this type of assembly.

The support plate section 28 in the exemplary embodiment shown here also has a support element 32 which is designed in one piece with the support plate section 28. The support element 32 serves to provide contact with a brush bundle 52 of the brush seal 16.

In addition, it can be seen that the brush head 14 consists of a clamping tube 46 by which fiber or wire bundles 50 are affixed to a core wire 48. The fiber or wire bundles 50 protrude out of the brush seal housing 12 and form the brush bundle 52 whose end region 54 can be brought into contact with a respective sealing surface of the rotor 56 to seal an annular clearance between the stator and rotor 56. To secure the brush bundle 52 against pressure differences and against bending in the axial direction of the respective turbo engine, in particular the respective aircraft engine, the support plate section 28 with the support element 32 serves to secure it. The support element 32 comes to rest against the brush bundle 52.

The brush seal system 10 may be designed in the form of ring segments on the whole.

Figure 2:
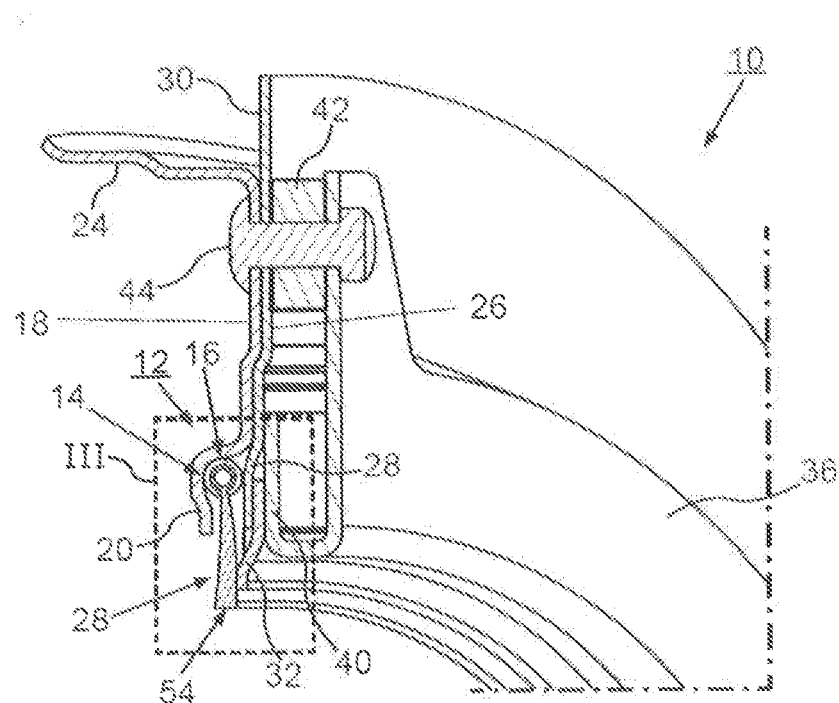
FIG. 2 shows in a schematic perspective view a section through a brush seal system in a second embodiment according to the invention.

FIG. 2 shows in a schematic view a cross-section through a brush seal system according to a second embodiment and is explained below in conjunction with FIG. 3 which shows an enlarged schematic view of the detail III shown in FIG. 2. In contrast with the first embodiment of the brush seal system 10 shown in FIG. 1, in the second embodiment of the brush seal system 10 shown here, the support element 32 is designed as a separate element. Furthermore, it can be seen that the cover plate section 20 of the first sheet metal part 18 is curved inward radially below the brush head 14 and thus the brush seal 16 is held and secured in place in a loss-free manner in the brush seal housing 12. Alternatively or additionally, the brush seal 16 may also be clamped between the cover plate section 20 and the support plate section 28 as illustrated in FIG. 1. The brush head 14 in turn consists of the clamping tube 46, by which the fiber or wire bundle 50 is affixed on the core wire 48. The fiber or wire bundle 50 protrudes out of the brush seal housing 12 and forms the brush bundle 52 whose end region 54 can in-turn be brought into contact with a respective sealing surface of a rotor (not shown) in order to seal an annular clearance between a stator and a rotor.

The support element 32 which has an end region curved in the upstream direction as seen in the direction of flow and against which the brush bundle 52 is in contact is arranged outside of the brush seal housing 12 and is clamped between the second sheet metal part 26 of the brush seal housing 12 and the reinforcing element 36 and is thereby secured in position. Due to this form-fitting connection, replacement of the support element 32 is facilitated. Alternatively or additionally, the support element 32, which in the present case is also designed in the form of a segmented ring like the brush seal system 10, may also have a physically bonded connection to the second sheet metal part 26 and/or the reinforcing element 36. The reinforcing element 36 according to this embodiment has an approximately U-shaped contact element 40, such that one leg is at least partially in contact with a corresponding region of the second sheet metal part 26. The reinforcing element 36 is in-turn designed as a curved metal plate and is connected by the rivet 44 to the brush seal housing 12, i.e., to the first and second sheet metal parts 18, 26. A sliding element 42, which is designed as a sliding block, is in-turn arranged between the reinforcing element 36 and the second sheet metal part 26, and is also secured on the brush seal system 10 by the rivets 44.

Figure 3:
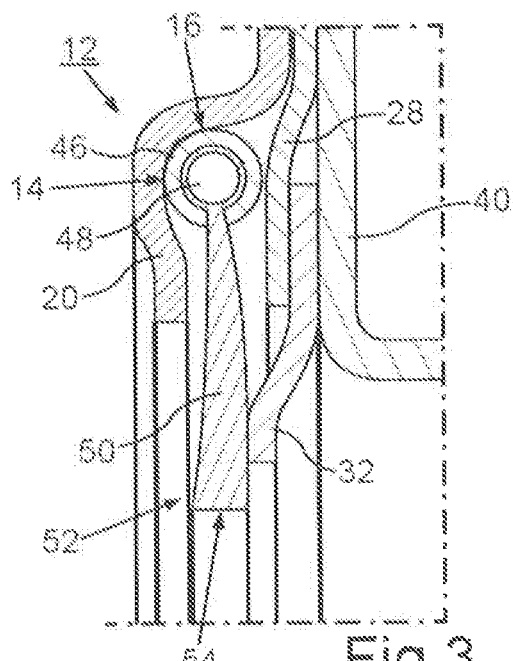
FIG. 3 shows an enlarged schematic view of detail III shown in FIG. 2.

As can be seen in FIG. 3 in particular, the end region of the support element 32 on the inside radially is arranged closer to an end region of the brush bundle 52 opposite the brush head 14 than the corresponding end region on the inside radially of the second sheet metal part 26. This ensures that in the case of scraping on the rotor, only the support element 32 but not the second sheet metal part 26 or the brush seal housing 12 is itself affected because of the separate design of the support element 32, repair or replacement of the support element 32 after damage is greatly facilitated.

Since the second sheet metal part 26 and the support element 32 are designed as separate components, a separation of the functionalities of "encasing and/or securing the position of the brush seal 16" and "supporting the brush bundle 52" is ensured. Due to this separation of functions, the materials for the second sheet metal part 26 and for the separate support element 32 may be selected independently of one another. For example, the support element 32 may be made of a softer material than the second sheet metal part 26 to ensure behavior of the brush seal system 10 that is more tolerant of scraping. Basically the support element 32 need not also be designed as a sheet metal part or a metal part but instead may also consist of a ceramic material and/or a ceramic fiber composite material or the like, for example. Additional advantages for separation consist of increasing the structural and geometric design freedom so that different wall thicknesses, for example, differences in structural mechanical behavior during operation, different sealing effects and the like can be implemented inexpensively and with simple designs.

The brush seal system 10 shown in FIGS. 2 and 3 with a separately designed support element 32 can also be manufactured by the following method: providing the brush seal housing 12 including the first and second sheet metal parts 18, 26, arranging the brush seal 16 so that at least the brush head 14 of the brush seal 16 is accommodated in the brush seal housing 12 and secured in position there, providing the separately designed support element 32 and arranging the support element 32 on the second sheet metal part 26 of the brush seal housing 12, so that the brush bundle 52 protruding away from the brush head 14 of the brush seal 16 can be supported against sagging by the support element 32. Dismantling of the brush seal system 10 may be performed fundamentally in the opposite order.

LIST OF REFERENCE NUMERALS 10 brush seal system
12 brush seal housing
14 brush head
16 brush seal
18 first sheet metal part
20 cover plate section
22 radial flange
24 axial flange
26 second sheet metal part
28 support plate section
30 fastening section
32 support element
34 central section
36 reinforcing element
38 basic element
40 contact element
42 sliding element
44 rivets
46 clamping tube
48 core wire
50 fiber and wire bundles
52 brush bundle
54 end region of brush bundle
56 rotor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brush seal system for sealing a clearance between components of a turbo engine that are movable in relation to one another, comprising:
   a brush seal with a brush head; and
   a brush seal housing, wherein the brush head of the brush seal is accommodated in the brush seal housing, wherein the brush seal housing includes a first component with a cover plate section on a first end of the first component and a second component with a support plate section on a first end of the second component;
   wherein the first component has a portion that is disposed radially over the brush seal, has a radial flange that extends radially outward from the portion, and has an axial flange forming a fish mouth seal integrally formed in the first component at a radially outermost end of the radial flange, wherein the first end of the first component is opposite from the radially outermost end of the radial flange.

2. The brush seal system according to claim 1, wherein the second component includes a fastening section on a second end of the second component, wherein the first end of the second component is opposite from the second end of the second component and wherein the brush seal system is directly or indirectly fastenable on a guide vane or a guide vane cluster of the turbo engine via the fastening section.

3. The brush seal system according to claim 1, further comprising a reinforcing element which is secured on the second component in a region of the support plate section.

4. The brush seal system according to claim 3, wherein the reinforcing element is a curved metal plate and/or the reinforcing element is riveted to the second component and/or a sliding element is arranged between the reinforcing element and the second component.

5. The brush seal system according to claim 3, wherein the reinforcing element has a contact element on a first end of the reinforcing element and has an axial flange forming a second fish mouth seal on a second end of the reinforcing element, wherein the first end of the reinforcing element is opposite from the second end of the reinforcing element.

6. The brush seal system according to claim 1, wherein the support plate section of the second component has a support element engageable with a brush bundle of the brush seal.

7. The brush seal system according to claim 6, wherein the support element and the support plate section are formed as one piece.

8. The brush seal system according to claim 6, wherein the support element is a separate element from the support plate section.

9. The brush seal system according to claim 8, wherein the support element is arranged between the support plate section and a reinforcing element.

10. The brush seal system according to claim 1, further comprising a reinforcing element which is secured on the second component in a region of the support plate section and a sliding element arranged between the reinforcing element and the second component, wherein the sliding element is a bearing site having one degree of translatory freedom for spoke centering of the brush seal system.

11. The brush seal system according to claim 1, wherein the first component and the second component are formed as a single piece or are separate components.

12. The brush seal system according to claim 1, wherein the first component and the second component are connected to one another in a form-fitting and/or physically bonded manner.

* * * * *